(12) United States Patent
Samanta et al.

(10) Patent No.: US 12,070,706 B2
(45) Date of Patent: Aug. 27, 2024

(54) PELLETIZED ACTIVATED CARBON AND METHODS OF PRODUCTION

(71) Applicant: Norit Americas, Inc., Marshall, TX (US)

(72) Inventors: Susnata Samanta, Medford, MA (US); Mark Kuil, Leusden (NL)

(73) Assignee: Norit Americas, Inc., Marshall, TX (US)

( * ) Notice: Subject to any disclaimer, the term of this patent is extended or adjusted under 35 U.S.C. 154(b) by 591 days.

(21) Appl. No.: 17/298,046

(22) PCT Filed: Nov. 26, 2019

(86) PCT No.: PCT/US2019/063147
§ 371 (c)(1),
(2) Date: May 28, 2021

(87) PCT Pub. No.: WO2020/112707
PCT Pub. Date: Jun. 4, 2020

(65) Prior Publication Data
US 2022/0096981 A1    Mar. 31, 2022

Related U.S. Application Data

(60) Provisional application No. 62/773,103, filed on Nov. 29, 2018.

(51) Int. Cl.
| | | |
|---|---|---|
| *C01B 32/30* | (2017.01) | |
| *B01D 39/20* | (2006.01) | |
| *B01D 53/02* | (2006.01) | |
| *B01D 53/52* | (2006.01) | |
| *B01J 20/20* | (2006.01) | |
| *B01J 20/28* | (2006.01) | |
| *B01J 20/30* | (2006.01) | |
| *C01B 32/318* | (2017.01) | |

(52) U.S. Cl.
CPC ......... *B01D 39/2062* (2013.01); *B01D 53/02* (2013.01); *B01D 53/52* (2013.01); *B01J 20/20* (2013.01); *B01J 20/2803* (2013.01); *B01J 20/28057* (2013.01); *B01J 20/28069* (2013.01); *B01J 20/28083* (2013.01); *B01J 20/3007* (2013.01); *B01J 20/3042* (2013.01); *C01B 32/30* (2017.08); *C01B 32/318* (2017.08); *B01D 2239/086* (2013.01); *B01D 2253/102* (2013.01); *B01D 2257/304* (2013.01); *C01P 2006/12* (2013.01); *C01P 2006/16* (2013.01)

(58) Field of Classification Search
CPC ..................................................... C01B 32/30
See application file for complete search history.

(56) References Cited

U.S. PATENT DOCUMENTS

| | | | | |
|---|---|---|---|---|
| 9,021,619 B2* | 5/2015 | Paoluccio | ............... | E03C 1/126 4/220 |
| 9,126,139 B2* | 9/2015 | Wilson | ................... | C12M 47/18 |
| 2006/0154815 A1 | 7/2006 | Susumu et al. | | |
| 2012/0043120 A1* | 2/2012 | Gadkaree | ............. | H01G 9/0029 174/257 |
| 2014/0171304 A1 | 6/2014 | Herrera et al. | | |
| 2017/0246567 A1* | 8/2017 | Mabe, Jr. | ............. | B01D 29/925 |
| 2018/0014576 A1* | 1/2018 | White | .................. | A61M 11/048 |

FOREIGN PATENT DOCUMENTS

WO    WO 02/083560 A1    10/2002

OTHER PUBLICATIONS

The International Search Report and Written Opinion of the International Searching Authority for International Application No. PCT/US2019/063147, mailed Mar. 11, 2020.
https://activatedcarbon.com/products/impregnated-activated-carbon, avilable at least early as Apr. 5, 2024.

* cited by examiner

*Primary Examiner* — Stuart L Hendrickson
(74) *Attorney, Agent, or Firm* — Finch & Maloney PLLC

(57) ABSTRACT

Activated carbon for removal of sulfur containing materials from fluids. The activated carbon has a high sulfur capacity and can be manufactured without the addition of a catalyst. Lignite is treated to provide an activated carbon with a high mesoporosity and total surface area. The starting material has a high ash content, such as greater than 10% by weight.

19 Claims, 1 Drawing Sheet

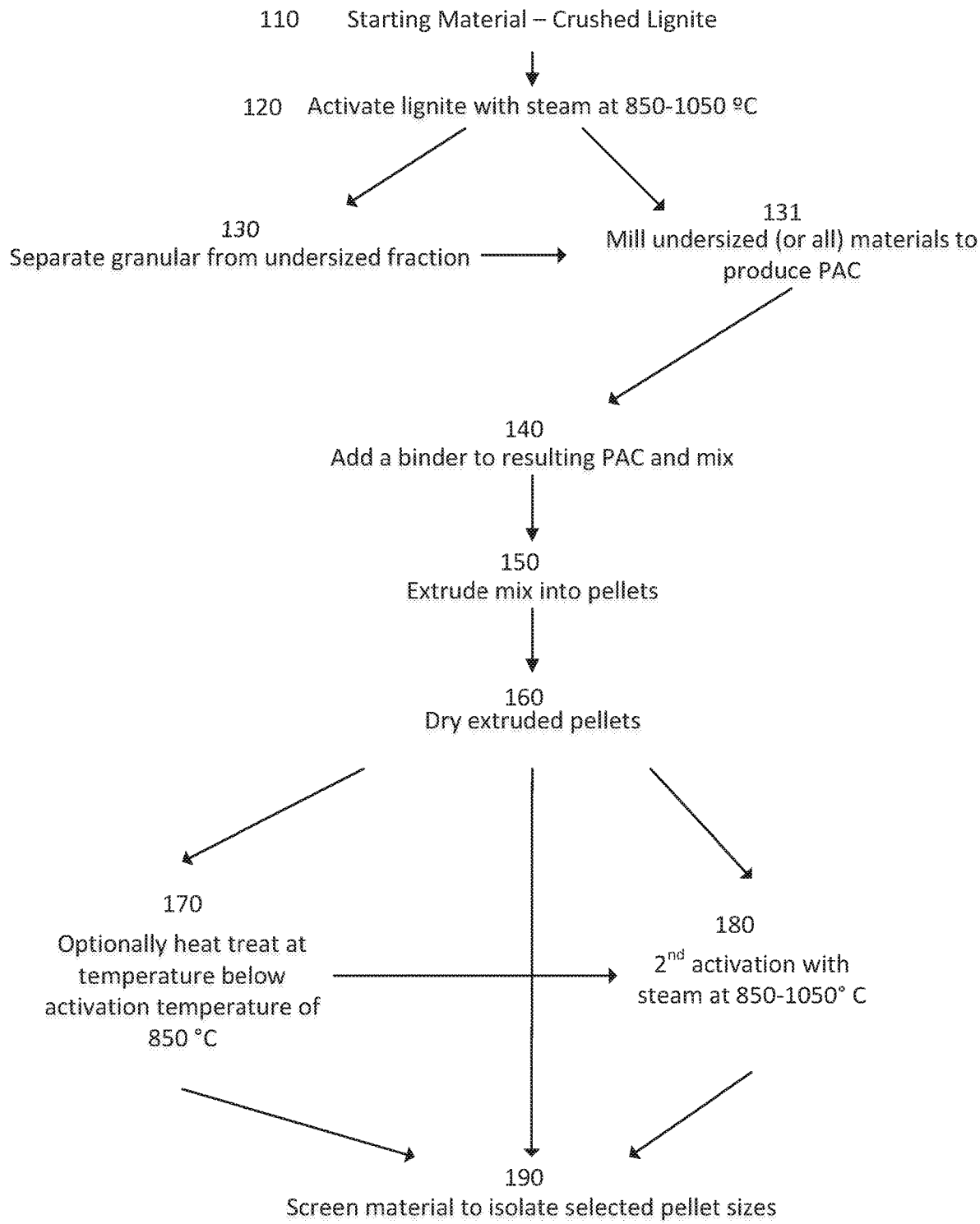

PELLETIZED ACTIVATED CARBON AND METHODS OF PRODUCTION

FIELD OF THE DISCLOSURE

This disclosure relates to activated carbon, and, in particular, to activated carbon useful in the removal of sulfur from fluids.

BACKGROUND

Activated carbon (AC) is a high surface area, highly porous material that is useful for the removal of impurities from fluids such as water and combustion gases. Activated carbon is made by pyrolyzing a carbonaceous material in the absence of oxygen and subsequently activating it in the presence of carbon dioxide or steam. Activated carbon is available in powder, granular and pellet form.

SUMMARY

In one aspect, a filtration media is provided, the filtration media comprising activated carbon void of added catalyst and having a hydrogen sulfide capacity of at least 0.2 g/mL when tested using ASTM 6646. In some embodiments the filtration media is derived from lignite including at least 10% ash by weight and may be in the form of pellets that can comprise a binder. In specific examples, the binder is carbonized. The filtration media can be a twice activated lignite. The filtration media can include at least three different metal oxides and ash analysis of the filtration media can exhibit greater than 1% by weight of each of the three different metal oxides. The activated carbon can have a ball-pan hardness by ASTM D3802 of greater than or equal to 60 mass %, a minimum mesopore volume of 0.20 cm$^3$/g and a BET surface area of greater than 350 m$^2$/g.

In another aspect, a method of making activated carbon pellets is provided, the method comprising combining a lignite powdered activated carbon with a binder, pelletizing the lignite powdered activated carbon and binder to produce pellets, treating the pellets at an elevated temperature. The method can include drying the pellets prior to activating the pellets and can be carried out without any addition of catalyst to the lignite activated carbon. The method can exclude the addition of alkali and alkali earth metal salts, oxides and hydroxides. The binder can comprise at least one of phenolic resins, polyvinyl alcohol (PVA), carboxymethylcellulose (CMC), polyethylene glycol (PEG), bentonite, calcium lignosulfonate, ammonium lignosulfonate, magnesium lignosulfonate, sodium lignosulfonate, thermoplastic resins, colloidal silica, water glass, starches, thermoset resins and acrylics. The method can include extruding the pellets and can also include decomposing the binder during activation. The lignite activated carbon can be produced by pyrolyzing lignite and activating the pyrolyzed material. The method may also include segregating activated pellets from particles smaller than 4 mm, smaller than 2 mm, smaller than 1 mm or smaller than 0.5 mm in diameter. Treating at an elevated temperature can include heat treatment, heat activation, or both.

In another aspect, a method of making activated carbon pellets is provided, the method comprising combining a lignite activated carbon with a binder, pelletizing the lignite activated carbon and binder to produce pellets, and drying the pellets to remove solvent from the pellets.

In another aspect, an activated carbon is provided, the activated carbon having a total pore volume of greater than 0.3, 0.35, 0.4 or 0.45 cm$^3$/g and a ratio of mesoporosity to total porosity of greater than 50%, 55%, 60% or 65%.

In another aspect, an activated carbon is provided, the activated carbon having a BET surface area of less than 600, 550, 500 or 450 m$^2$/g and a mesopore volume of greater than 0.2, 0.25 or 0.275 cm$^3$/g. The activated carbon can be produced from a starting material having an ash content of greater than 12% by weight. The carbon can be produced by twice activating a lignite starting material. The process of producing the activated carbon can be void of adding a catalyst that would aid in the removal of sulfur from a fluid stream.

In another aspect, a method is provided, the method comprising passing a fluid comprising hydrogen sulfide through activated carbon, the activated carbon comprising a virgin activated carbon essentially free of added catalyst and having a hydrogen sulfide capacity of at least 0.2 g/mL when tested using ASTM 6646, and removing hydrogen sulfide from the fluid. The fluid can be a mixture of gases or a liquid. The activated carbon can be derived from lignite coal having an ash content of greater than 10% on a dry basis by weight and may be in the form of pellets or granules. The pellets may have at least one dimension greater than 3 mm. Greater than 90%, 95% or 99% of the hydrogen sulfide, by mass, can be removed from the fluid in a single pass. Additional compounds comprising sulfur can be substantially removed from the fluid. An ash analysis of the activated carbon pellets shows greater than 1% calcium oxide, greater than 1% magnesium oxide and greater than 1% iron oxide.

BRIEF DESCRIPTION OF THE DRAWINGS

FIG. 1 provides a flow chart illustrating an embodiment of a method for producing activated carbon.

Various aspects of at least one example are discussed below with reference to the accompanying FIGURE, which is not intended to be drawn to scale. The FIGURE is included to provide an illustration and a further understanding of the various aspects and examples and is incorporated in and constitutes a part of this specification but is not intended to limit the scope of the disclosure. The drawing, together with the remainder of the specification, serves to explain principles and operations of the described and claimed aspects and examples. For purposes of clarity, not every component may be labeled in every FIGURE.

General Overview

Described herein is an activated carbon capable of removing large amounts of sulfur from a fluid stream without the use of added catalyst. In one set of embodiments, the activated carbon is produced from lignite and has a sulfur removal capacity of greater than 60%, greater than 70% or greater than 80% by mass. For example, one gram of the activated carbon can remove more than 600 mg of sulfur from a fluid stream. In some embodiments, the activated carbon can be in the form of pellets, providing for the flow of gases through a bed of the pellets with minimal pressure loss. The activated carbon can be produced, for example, by activating crushed lignite at 850 to 1050° C., separating activated granules from activated powder, mixing a binder into the activated powder, extruding the mixture into pellets, optionally drying and/or heat treating the pellets, and subsequently activating the pellets at a temperature of, for example, 850 to 1050° C. in the presence of water. The activated carbon can be produced without addition of catalysts, such as those commonly used in the industry that contain alkali metals or metal oxides.

DETAILED DESCRIPTION

When placed in contact with a fluid such as water or flue gas, activated carbon removes sulfur and sulfur containing compounds, such as hydrogen sulfide ($H_2S$) and mercaptans, by first reacting with the sulfur containing compound in the presence of moisture and then adsorbing the resulting elemental sulfur or oxidized forms of sulfur such as sulfur dioxide. This process involves a combination of a chemical reaction and absorbance and therefore cannot be characterized exclusively as either one. As used herein, sulfur removal will refer to this combination of processes where a compound including sulfur is either adsorbed directly or is first reacted and then adsorbed by the activated carbon. The original source of sulfur can be variable and can include, for example, hydrogen sulfide, mercaptans (thiols) and sulfonated organic compounds.

The activated carbon starting material can be, in one set of embodiments, lignite, also referred to as lignite coal. Lignite can have a high ash content and in various cases can exhibit an ash content, by weight, of greater than 10%, greater than 12%, greater than 15%, greater than 20% or greater than 25% when measured using ASTM D-3172. The ash content of the lignite starting material can include one or more metal oxides. In some embodiments, the ash composition includes three or more metal oxides such as iron, calcium and magnesium oxides at levels of greater than 1% each by weight. These same metal oxides are present at the same concentrations, or greater, in the pellets used to remove sulfur from a fluid stream, as described herein.

FIG. 1 provides a flow chart illustrating one technique for producing activated carbon having improved sulfur removal capabilities. The starting material is a carbon source having a high ash content, for example, greater than 10% ash by weight, when measured using ASTM D-3172. In this example, the starting material is crushed lignite 110. The crushed lignite is activated in the presence of steam 120 at a temperature of between 850 and 1050° C. to produce an activated carbon in a range of particle sizes. The larger granular material can be separated from undersized particles 130. The activated carbon granules can have a sulfur removal capacity of about 40% by weight or a hydrogen sulfide removal capacity of about 0.18 to 0.20 g/mL by ASTM D-6646. The undersized particles can be milled to a powder 131 to provide a material suitable for pellet formation. The D50 particle size of the milled material can be, for example, less than 30 µm, less than 25 from µm or less than 20 µm. In specific embodiments the particle size range can be, for example, 15 to 20 µm, 5 to 15 µm or 6 to 8 µm. Experiments have indicated that particles greater than 30 µm are not as effective as smaller particles. The resulting PAC from milling is added to a binder and thoroughly mixed to produce a viscous paste, slurry or mixture having the consistency of damp sand. This mixture is then pelletized 150 by, for example, extrusion or using a pelletizer. The resulting pellets are then optionally dried 160 at a temperature to remove most or all of any solvent that accompanies the binder. The drying temperature can be close to, at, or above the boiling point of a solvent that is used in the binder. For example, if water is used, the drying temperature can be above 80° C. or above 100° C. Drying times can be selected to effectively remove any solvent that is present. For example, greater than 90%, 95%, 99% or 99.9% of solvent present by weight may be removed by drying. Drying times can vary from one or two hours to one or more days. Dried pellets can be used directly to remove sulfur from fluids or can be further treated. For example, after drying, pellets can be treated at an elevated temperature. Treating at an elevated temperature can be heat treatment, heat activation, or both. Heat treatment involves heat treating the material 170 at a temperature below the activation temperature and/or in the absence of oxygen and water. A heat treatment step can be used, for example, to fix a solid binder and to remove volatile components of the binder. Heat treatment at an elevated temperature can also be a second activation process 180 that is carried out after pellet formation, after drying or after heat treatment. Activate can be carried out at a temperature above 850° C. and in the presence of steam or oxygen. After cooling, these carbon materials can have a sulfur removal capacity of about 60, 70 or 80% by weight or a hydrogen sulfide removal capacity of greater than 0.20, greater than 0.25, greater than 0.30, greater than 0.35 or greater than 0.40 g/mL by ASTM 6646. If the material is in the form of pellets, the pellets can be graded 190 for their intended use. Grading may be completed by screening the pellets for specific size ranges.

To improve sulfur removal efficiency, conventional activated carbons often include a catalyst that is added to the activated carbon during the manufacturing process. These catalysts include metal, alkali and alkali earth metal salts, oxides and hydroxides such as iron oxide, copper oxide, magnesium hydroxide, potassium hydroxide, sodium hydroxide, potassium iodide and potassium carbonate. These conventional activated carbons will typically be high in the content of one of these metal oxides. While improving sulfur removal efficiency, the presence of these catalysts can result in spent material that is a challenge to dispose of. In contrast, the activated carbons described herein are produced without adding a catalyst to the carbon, thus simplifying the disposal process. The activated carbons described herein may include less than 1%, less than 0.5%, less than 0.1% or less than 0.05% by weight of added catalyst. This added catalyst is supplemental to any alkali metals that may be natively present in the starting material.

To form pellets from the PAC, a binder can be added at various stages. For example, after the lignite is first activated, any resulting powdered activated carbon (<50 µm) can be mixed with a liquid binder and the mixed material can be extruded into pellets. As used herein, an activated carbon pellet is activated carbon that has been shaped into larger monolithic pieces. For example, pellets may be roughly spherical, cylindrical or square in cross section and may be of varying lengths. Pellets may have an aspect ratio of from 1:1 to 1:10, 1:1 to 1:5, 1:1 to 1:3, 1:1 to 1:2 or 1:1 to 1:1.5. Cylindrical or spherical pellets can have an average diameter of greater than 1 mm, greater than 2 mm, greater than 3 mm, greater than 4 mm or greater than 5 mm and a length of greater than 1 mm, greater than 2 mm, greater than 3 mm, greater than 4 mm, greater than 5 mm or greater than 6 mm. In specific examples, the average pellet diameter is in the range of 1 to 6 mm, 2 to 5 mm, 3 to 5 mm, 1 to 3 mm or 3 to 6 mm. Appropriate mesh sizes for pellets include 3×6, 4×10 and 3×10. In applications to remove sulfur, pellets sizes can be consistent or can be varied. For instance, in some sulfur removal applications the pellet diameter can be consistent, i.e., varying by less than 10%. For specific applications, pellet size can be selected to provide adequate surface area for sulfur removal while minimally interfering with the flow of gas through a bed of the pellets. Pellets may be made using an extruder or a pelletizer such as a spheronizer. Pellets can be resistant to fracture and abrasion and can exhibit a ball-pan hardness by ASTM D-3802 of greater than or equal to 40, 50, 60 or 70% by mass.

A binder can be any substance that can be used to provide permanent adhesion between particles to form pellets. Binders may be applied as a powder in combination with an appropriate solvent, as a solution or dispersion that includes a binder and a solvent. Pellets can be extruded or pelletized after the binder, solvent and powder have been mixed together. After pelletizing, the solvent or carrier can be removed by drying, such as through evaporation or decomposition, to leave a hardened pellet. Binders may be natural or synthetic, organic or inorganic, liquid or solid, and in some cases are polymers. The amount of binder used in a particular embodiment can be the minimum amount of material capable of permanently adhering particles together to form durable pellets. Weight ranges for the amount of binder in the activated carbon pellets include (for just the binder not including any carrier solvent) 10 to 50%, 10 to 30% or 10 to 20% by weight. In a liquid binder, the ratio of binder to liquid carrier, by weight, may be greater than or equal to, for example, 0.1:2.0, 1:2, 1:1 or 2:1. In some embodiments, a binder solution can be made by mixing together equal parts of binder and solvent. Binders may be salts and may include a cation, such as calcium, sodium, magnesium or ammonium. Specific examples of binders useful with the activated carbons described herein include phenolic resins such as novolac resins and resol resins, polyvinyl alcohol (PVA), carboxymethylcellulose (CMC), polyethylene glycol (PEG), bentonite, lignosulfonates such as calcium lignosulfonate, magnesium lignosulfonate, sodium lignosulfonate and ammonium lignosulfonate, polyethylene and other thermoplastic resins, colloidal silica, water glass, starches, thermoset resins such as powder epoxy and polymer emulsions such as acrylics. The alkali metal concentration, from materials such as calcium, sodium or magnesium that is added via the binder can be limited to less than 5%, less than 2%, less than 1% or less than 0.5 weight % of the final material that is intended for sulfur removal.

As used herein, drying, heat treatment and heat activation are three different treatments. Drying is used to remove solvent from the pellets. Heat treatment and heat activation are both considered to be processes of treating at an elevated temperature, and treating at an elevated temperature does not include drying. Heat treatment is often used to treat samples that include a solid binder, and is typically, though not necessarily, carried out in the absence of moisture or oxygen and is typically at a lower temperature than heat activation. Heat activation is typically at a higher temperature, can be done in the presence of steam or carbon dioxide and promotes an increase in porosity and surface area. As used herein, activation results in an increase in total porosity of at least 10%.

In some embodiments, the material does not need to be treated at an elevated temperature but can be used to remove sulfur directly after drying. In these cases, the material will have been activated at least once but not necessarily more than once. For instance, crushed lignite can be activated, any resulting powder can be mixed with a binder and extruded, and the resulting pellets can be dried and used directly in a system for removing sulfur from a fluid stream such as combustion gases. Drying can include, for example, subjecting the material to a temperature of from 50 to 150° C. for a period of 24 hours to drive off any solvent such as water.

In other embodiments, pellets or granules comprised of previously activated carbon can be heat treated at a temperature below the activation temperature to carbonize material such as a binder. However, prior to carbonizing, or absent carbonizing, the material can be subjected to drying conditions sufficient to drive off solvent that may be present. Drying can result in a weight loss of about 25% when the undried material includes 50% of a binder solution by weight and the binder solution comprises 50% solvent by weight. In one set of embodiments the solvent is water, and the material can be subjected to a temperature of from 80 to 130° C. for about 24 hours. Removal of the solvent through drying allows a subsequent high temperature activation step to proceed without any instantaneous solvent evaporation that can destroy the structure of the pellets.

Pellets can be heat treated at a temperature of greater than 600° C., 700° C., 800° C. or 900° C. The heat treating temperature can also be limited to be below 1000° C., below 850° C., below 700° C. Heat treatment can proceed in an inert atmosphere that is substantially free of oxygen. In some embodiments, heat treatment times can be greater than 10 minutes, greater than 30 minutes, greater than 60 minutes or greater than 120 minutes. For granules containing a powdered binder such as bentonite, heat treatment is typically carried out in an inert atmosphere that is free of oxygen and water, such as under dry nitrogen. In one example of heat treatment, activated carbon pellets that include a powdered binder can be heat treated at about 900° C. under nitrogen in the absence of oxygen for a period of 30 minutes. The heat treatment process can remove or destroy the organic component of any binder that is present. Non-volatile components such as inorganic ions and sulfur may remain with the carbon in part or in whole. Although the binder may be substantially destroyed or removed by the heat treatment process, the structure of any pellets is retained and the hardness of the pellets can be increased. The yield after heat treatment is typically about 90% of the mass of the pellets prior to heat treatment.

After drying, and optionally after heat treatment, the carbon can be activated (for a second time) by thermally treating at a temperature greater than 850° C. in the presence of a gas containing oxygen. Suitable gases include steam, oxygen, carbon dioxide, carbon monoxide or mixtures thereof. This activation can increase the porosity of the material and in particular can increase the mesoporosity. Mesopores are pores that have a width of from 2-50 nm. Micropores have a width of less than 2 nm. Pore size can be determined using the TriStar Plus II instrument as described below. Microporosity is the volume of pores that can be attributed to micropores and mesoporosity is the volume of the pores that can be attributed to mesopores. Different embodiments can use activation temperatures of from 800 to 1400° C., 900 to 1300° C., 1000 to 1200° C. and 850 to 1100° C. Reaction times at a selected temperature should be chosen to adequately achieve a desired porosity and sulfur removal efficiency. In various embodiments, these reaction times can range from 30 minutes to 6 hours, 1 to 6 hours, 1 to 4 hours, 1 hour to 3 hours, 3 hours to 24 hours, 12 hours to 48 hours or 1 to 3 days. The atmosphere for the activation process can include an oxidizing agent, such as water, that is typically provided in the form of steam. The water provided can be, for example, from 40 to 90% by weight of the starting dry pellets. At the conclusion of the activation process, the activated carbon is allowed to cool. The yield of activated carbon can be about 40, about 50 or about 60% of the mass of the starting pellets prior to activation. The resulting activated carbon, made from lignite without the addition of a catalyst, can have a sulfur removal efficiency, by weight, of greater than 50%, greater than 60%, greater than 70% or greater than 80%. In specific embodiments, 4 mm diameter by 6 mm long pellets of the activated carbon have been shown to have an $H_2S$ removal capacity of greater than 0.39 g/mL when measured using ASTM D-6646.

The activated carbon disclosed herein can be provided in a variety of physical forms including, powders, granules, pellets, slurries and composites. Regardless of its physical form, the activated carbon can be contacted with a fluid that includes a source of sulfur. In some cases, the activated carbon can be mixed with a liquid, allowed to react, and then separated from the liquid, e.g., by filtration, to reduce the sulfur content of the liquid. The liquids include water and petroleum products such as gasoline and diesel. In other examples, a bed of pellets or granules is used. For instance, a gas stream such as combustion gases can be passed through a bed of pellets to remove hydrogen sulfide from the combustion gases. A bed of pellets minimally restricts the flow of gases through the bed, allowing for a high volume of gas treatment with minimal back pressure. The pellets can provide adequate surface area to react and adsorb sulfur containing compounds that are present in the gas stream. For example, pellet beds can be used to remove more than 50%, more than 75%, more than 90%, more than 95%, more than 98% or more than 99% of the $H_2S$ or total sulfur in a fluid such as a stream of combustion gases. The volumetric ratio of pellets to void space in a bed can be, in various embodiments, from 10:1 to 1:1, 5:1 to 1:1, 3:1 to 1:1 or 5:1 to 1:2.

EXAMPLES

In a set of experiments, two different sample runs (Samples 1 and 2) were made using the same procedure as outlined in FIG. 1 and described below. In this example, crushed lignite having an ash content of 16.28% dry basis was fed to a multi-hearth furnace at a rate of 6125 kg/hr and activated at 925° C. by contacting with 5150 kg/hr steam to produce an activated carbon with ash content of 40.83% a vibrated feed density of 0.446 g/ml (6×20 mesh fraction), and an Iodine Number of 550 mg/g by ASTM D4607. The activated carbon was screened to recover a 4×8 mesh granular product which was analyzed for $H_2S$ capacity using method ASTM-D6646. BET surface area, mesopore volume, micropore volume and total pore volume were also measured. Total pore volume, mesopore volume, micropore volume and average pore width were measured using BJH (Barret, Joiner and Halenda) analysis on a Micrometrics TriStar II Plus porosity instrument. The instrument was run with a nitrogen relative pressure ratio, $P/P_0$, of 0.0001 to 0.99. Analytical results are provided in Table 1. The −8 mesh undersize fraction of activated carbon was milled in a Bradley Pulverizer roll mill to produce a powder activated carbon (PAC) with 99% passing 325 mesh on an Alpine Air Jet Sieve. The PAC was also analyzed for ash (32.49%) and Iodine Number (550 mg/g) by ASTM D4607. A 4 kg batch was prepared by combining 2 kg of 50% aqueous solution of lignosulfonate binder with 2 kg of PAC having a binder (dry basis) to PAC (dry basis) ratio of 52:100, by weight. The batch was processed in a 20 hp Feeco batch pin mixer operating at 300 rpm for 75 seconds to produce a paste. The paste was processed in a Bonnot 2" single screw extruder with twin packers operating at 10 rpm. A 1" thick die plate with 34×4 mm diameter holes formed 4 mm extrudates which were cut to a length of 6-10 mm with a die face cutter. These pellets were tray-dried overnight in a convection oven at 95° C. to a moisture content of about 5%. 400 g of dried pellets were then activated in an electrically heated batch rotary kiln at 900° C. for 2 hours in an atmosphere of 1 liter/min nitrogen and 100 g/hr steam. No catalyst was added during the production process.

After cooling, the pellets were analyzed and tested for $H_2S$ capacity, BET surface area, mesopore volume, micropore volume and total pore volume. The results for sample 1 and sample 2 are provided separately in Table 1. The $H_2S$ capacity of each of the sample treated materials was about twice that of the activated lignite starting material. The samples also exhibited a BET that was greater than the starting PAC by at least 42 $m^2/g$, a mesopore volume that was more than double that of the starting PAC and a total pore volume that was at least 80% greater than that of the starting PAC.

| Carbon type | $H_2S$ capicity ASTM 6646 (g/mL) | BET Surface Area ($m^2/g$) | Meso pore volume ($cm^3/g$) | Total pore volume (meso plus micro) ($cm^3/g$) | Micro pore volume ($cm^3/g$) |
|---|---|---|---|---|---|
| Activated lignite starting material, 4 × 8 mesh fraction | 0.20 | 302 | 0.127 | 0.254 | 0.127 |
| Sample 1 | 0.39 | 444 | 0.29 | 0.48 | 0.19 |
| Sample 2 | 0.40 | 366 | 0.305 | 0.459 | 0.154 |

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. Filtration media comprising:
   activated carbon void of added catalyst and having a hydrogen sulfide capacity of at least 0.2 g/mL when tested using ASTM 6646.

2. The filtration media of claim 1 wherein the activated carbon is derived from lignite including at least 10% ash by weight.

3. The filtration media of claim 1 wherein the activated carbon is activated carbon pellets.

4. The filtration media of claim 3 wherein the activated carbon pellets comprise a binder.

5. The filtration media of claim 4 wherein the binder comprises a carbonized binder.

6. The filtration media of claim 1 wherein the activated carbon consists essentially of twice activated lignite.

7. The filtration media of claim 1 having a ball-pan hardness by ASTM D3802 of greater than or equal to 60 mass %.

8. The filtration media of claim 1 wherein the activated carbon has a minimum mesopore volume of 0.20 $cm^3/g$ and the ash of the activated carbon includes three different metal oxides, each at a concentration of greater than 1% by weight.

9. The filtration media of claim 1 wherein the activated carbon has a BET surface area of greater than 350 m²/g.

10. A method comprising:
passing a fluid comprising hydrogen sulfide through activated carbon, the activated carbon comprising an activated carbon essentially free of added catalyst and having a hydrogen sulfide capacity of at least 0.2 g/mL when tested using ASTM 6646; and
removing hydrogen sulfide from the fluid.

11. The method of claim 10 wherein the fluid is a mixture of gases.

12. The method of claim 10 wherein the fluid is a liquid.

13. The method of claim 10 wherein the activated carbon is derived from coal having an ash content of greater than 10% by weight.

14. The method of claim 10 wherein the activated carbon is in the form of pellets.

15. The method of claim 10 wherein the activated carbon is derived from lignite activated carbon.

16. The method of claim 14 wherein the activated carbon pellets include pellets having at least one dimension greater than 3 mm.

17. The method of claim 10 wherein greater than 90%, 95% or 99% of the hydrogen sulfide, by mass, is removed from the fluid in a single pass.

18. The method of claim 10 wherein at least one additional compound comprising sulfur is substantially removed from the fluid.

19. The method of claim 10 wherein an ash analysis of the activated carbon pellets shows greater than 1% calcium oxide, greater than 1% magnesium oxide and greater than 1% iron oxide.

* * * * *